United States Patent
Kang

(10) Patent No.: US 9,357,601 B2
(45) Date of Patent: May 31, 2016

(54) LIGHT EMITTING DRIVING APPARATUS AND METHOD OF CONTROLLING THE SAME

(71) Applicant: SAMSUNG ELECTRONICS CO., LTD., Suwon-si (KR)

(72) Inventor: Jeong-il Kang, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/465,321

(22) Filed: Aug. 21, 2014

(65) Prior Publication Data

US 2015/0257215 A1 Sep. 10, 2015

(30) Foreign Application Priority Data

Mar. 10, 2014 (KR) ........................ 10-2014-0027806

(51) Int. Cl.
*H05B 33/08* (2006.01)

(52) U.S. Cl.
CPC ........ *H05B 33/0815* (2013.01); *H05B 33/0851* (2013.01)

(58) Field of Classification Search
USPC ...... 315/185 R, 186, 224, 247, 291, 307, 308
See application file for complete search history.

(56) References Cited

U.S. PATENT DOCUMENTS

| 8,344,657 | B2 * | 1/2013 | Zhan | ................... | H05B 33/0815 315/291 |
| 2011/0260648 | A1 * | 10/2011 | Hamamoto | ........ | H05B 33/0848 315/294 |
| 2011/0285307 | A1 * | 11/2011 | Kimura | .............. | H05B 33/0848 315/250 |

* cited by examiner

*Primary Examiner* — Thai Pham
(74) *Attorney, Agent, or Firm* — Sughrue Mion, PLLC

(57) ABSTRACT

Provided is a light emitting driving apparatus, including a driver configured to drive a light emitting device, a switch configured supply power to the light emitting device, and a controller configured to adjust a switching off time of the switch according to a voltage applied to the light emitting device.

12 Claims, 11 Drawing Sheets

(a)

(b)

(c)

(a)

(b)

(c)

LIGHT EMITTING DRIVING APPARATUS AND METHOD OF CONTROLLING THE SAME

CROSS-REFERENCE TO RELATED APPLICATIONS

This application claims priority from Korean Patent Application No. 10-2014-0027806, filed on Mar. 10, 2014, in the Korean Intellectual Property Office, the disclosure of which is incorporated herein by reference in its entirety.

BACKGROUND

1. Field

Apparatuses and methods consistent with the present exemplary embodiments relate to a light emitting driving apparatus and a method of controlling the same, and more particularly, to a light emitting driving apparatus and a method of controlling the same, for minimizing a load fluctuation range of a light emitting device.

2. Description of the Related Art

A conventional liquid crystal display (LCD) device is thick and lightweight and has low driving voltage and power consumption compared with other display devices and thus has been widely used. However, since the LCD device is a non-emitting device that is not capable of emitting light by itself, the LCD device requires a separate backlight for supplying light to a liquid display panel.

As a backlight light source of the LCD device, a cold cathode fluorescent lamp (CCFL), a light emitting diode (LED), etc. have mainly been used. A CCFL is disadvantageous in that the CCFL uses mercury (Hg), which can cause environmental pollution, has a low response speed and a low color gamut, and is inappropriate for a short, small, and light weight LCD panel.

On the other hand, an LED is advantageous as a backlight source because the LED does not use environmentally hazardous chemicals and is thus environment-friendly, and has impulse driving. In addition, the LED is advantageous because the LED has excellent color gamut, luminance, color temperature, etc. Furthermore, the color of the lights of the LED can randomly change by adjusting an amount of red, green, and blue LEDs, and is appropriate for a short, small, and light weight LCD panel. Accordingly, the LED has been widely used as a backlight source of an LCD panel, etc.

Figure 1:
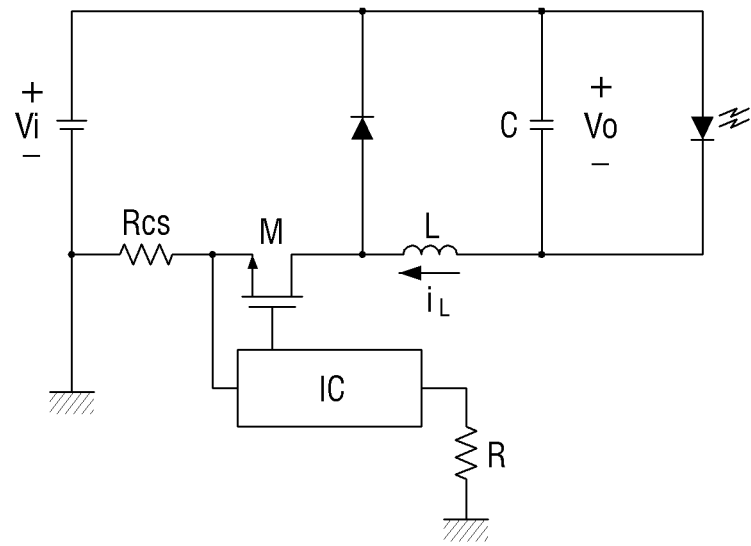
Figure 2:
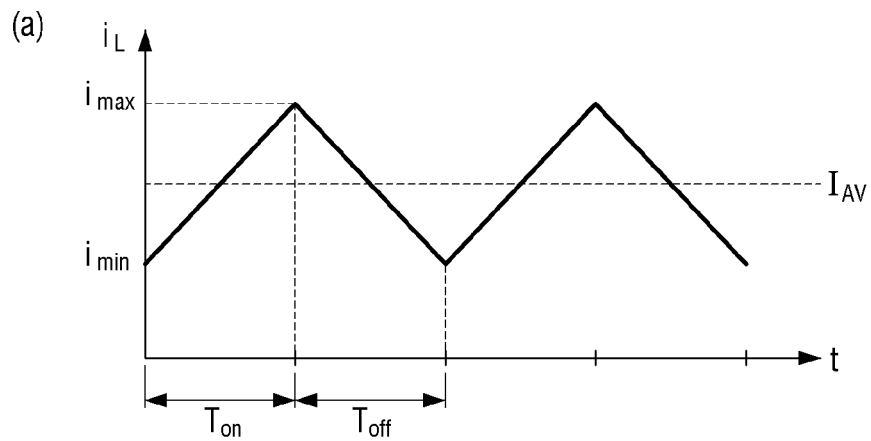
Figure 2:
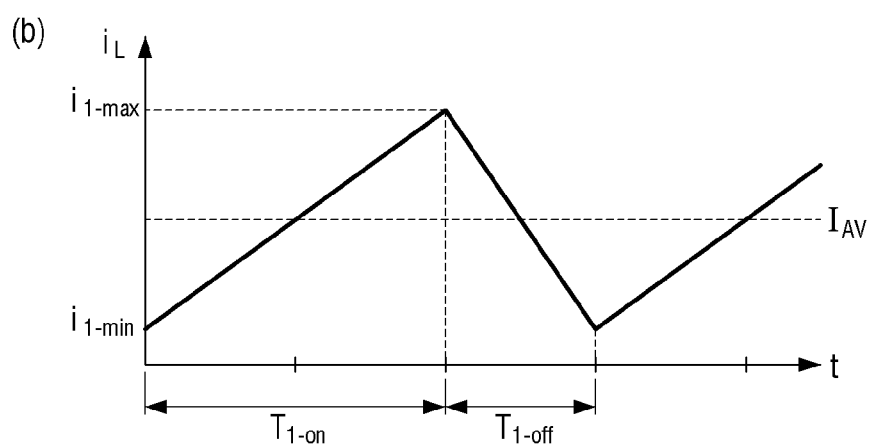
Figure 2:
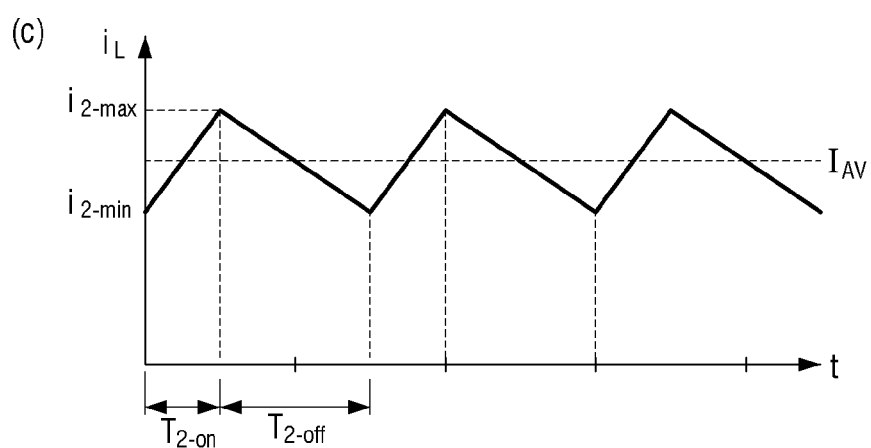

An LCD having a backlight which employs an LED requires a driving circuit for supplying a predetermined current to the LED. A pulse width modulation (PWM) type direct current (DC)-DC converter is mainly used in a driving circuit for driving the LED at predetermined current or voltage. FIG. 1 illustrates a circuit diagram of a conventional light emitting driving apparatus 10. FIGS. 2(a)-2(c) illustrate various examples of graphs of a current waveform characteristic according to a frequency of a conventional light emitting driving apparatus.

Referring to FIG. 1, a conventional light emitting driving apparatus 10 includes a light emitting device and a power source for supplying DC power to the light emitting device. In addition, a diode, a capacitor, and an inductor are disposed between the light emitting device and the power source, and a switch M is connected between one side of the inductor and one side of the power source. As shown in FIG. 1, the switch M is connected to a PWM adjuster integrated circuit (IC) for adjusting an on-off duty ratio of the switch M, according to a voltage detected from a voltage detecting resistor Rcs. In this case, an average value of inductor current has the same value as output current that flows in the light emitting device, according to the characteristics of the shape of a circuit.

Referring to FIGS. 2(a)-(c), there is illustrated a waveform of an inductor current according to the circuit illustrated in FIG. 1, when the circuit operates in a steady-state. Referring to FIG. 2(a), when the switch M is turned on, the inductor current increases, and when the switch M is turned off, the inductor current decreases. In this case, an average value of the inductor current is equal to an output current of the light emitting device. In addition, in order to control an average value of the output current using only information about the switch current of a turn-on period detected by the voltage detecting resistor Rcs, the PWM adjuster IC controls the turn-on period such that output current detected at a turn-on point in time and an average value of the output current detected at a turn-on point in time are a target current value.

However, according to a conventional light emitting device, when an output voltage or an input voltage varies, a switching frequency varies. That is, when a high voltage is applied to a light emitting device, a turn-on period of a switch is increased to lower a switching frequency. On the other hand, when a low voltage is applied to the light emitting device, the turn-on period of the switch is decreased to raise a switching frequency. FIG. 2(b) illustrates a case in which a ripple of an inductor current increases as a switching frequency decreases. FIG. 2(c) illustrates a case in which a ripple of an inductor current decreases as a switching frequency increases.

Accordingly, when a switching frequency decreases, a switching ripple of an output current remarkably increases, and when the switching frequency increases, a switching loss is generated and heat is generated from a circuit for a light emitting device.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

The exemplary embodiments provide a light emitting driving apparatus and a method of controlling the same, for adjusting switching time of a switch according to a voltage applied to a light emitting device.

According to an aspect of an exemplary embodiment, there is provided a light emitting driving apparatus including a driver configured to drive a light emitting device, a switch configured to supply power to the light emitting device, and a controller configured to adjust a switching off time of the switch according to a voltage applied to the light emitting device.

The light emitting driving apparatus may further include a pulse width modulation (PWM) adjuster connected to the switch and configured to adjust a PWM of the switch, wherein the controller may control the PWM adjuster to adjust the PWM of the switch based on the adjusted switching off time.

The light emitting driving apparatus may further include a voltage detector connected to the light emitting device and configured to detect the voltage applied to the light emitting device, such that the controller may adjust the switching off time of the switch according to the detected voltage.

The controller may include a plurality of resistance devices connected to the PWM adjuster and a switch connected in parallel to at least one of the plural resistance devices.

The controller may also include a voltage comparator configured to compare the detected voltage with a reference voltage and to output a switching signal of the switch.

The controller may include a transconductance amplifier configured to convert the detected voltage into current corresponding to the switching off time of the switch, such that the current is output to the PWM adjuster.

The controller may include a storage configured to store information about the switching off time corresponding to a digital signal of the voltage applied to the light emitting device, an AD converter configured to convert the detected voltage into a digital signal, and a serial converter configured to detect the switching off time corresponding to the converted digital signal based on the stored information and to output the switching off time to the PWM adjuster.

The light emitting driving apparatus may further include a light emitter including the light emitting device.

The light emitting driving apparatus may further include a connector configured to connect the light emitting driving apparatus with the light emitting device.

The connector may include a plurality of pins and the controller may adjust the switching off time of the switch based on the voltage applied to at least one of the plurality of pins according to the connector of the light emitting device.

The light emitting device may include at least two open pins or two circuited pins.

The light emitting device may include a light emitting diode (LED) array formed by connecting a plurality of LEDs in series.

According to another aspect of an exemplary embodiment, there is provided a method of controlling a light emitting driving apparatus including applying a voltage to a light emitting device, adjusting a switching off time of a switch according to the applied voltage, and switching a power supplied to the light emitting device according to the adjusted switching off time.

The method may further include adjusting a PWM of the switch, and adjusting the PWM of the switch based on the adjusted switching off time.

The method may further include detecting a voltage applied to the light emitting device, and adjusting the switching off time of the switch according to the detected voltage.

The method may further include converting the detected voltage into a current corresponding to the switching off time of the switch.

The method may further include storing information about the switching off time corresponding to a digital signal of the voltage applied to the light emitting device, converting the detected voltage into a digital signal, and detecting the switching off time corresponding to the converted digital signal based on the stored information.

According to the various exemplary embodiments, even if a load value of a light emitting device or a voltage applied to the light emitting device is changed, change in switching frequency may be minimized, thereby preventing heat, electromagnetic interference (EMI), ripple, etc. due to change in switching frequency.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

Figure 3:
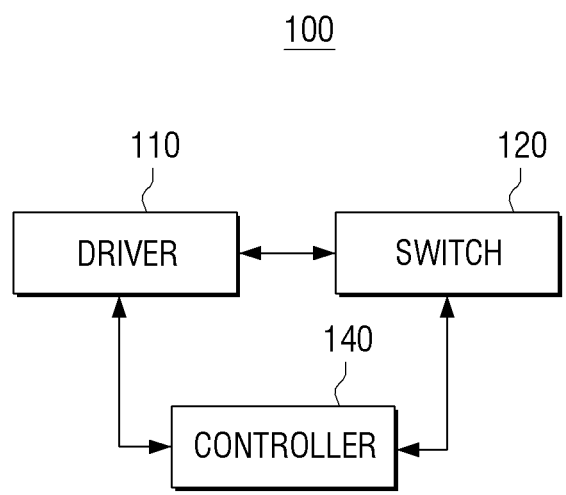
Figure 9:
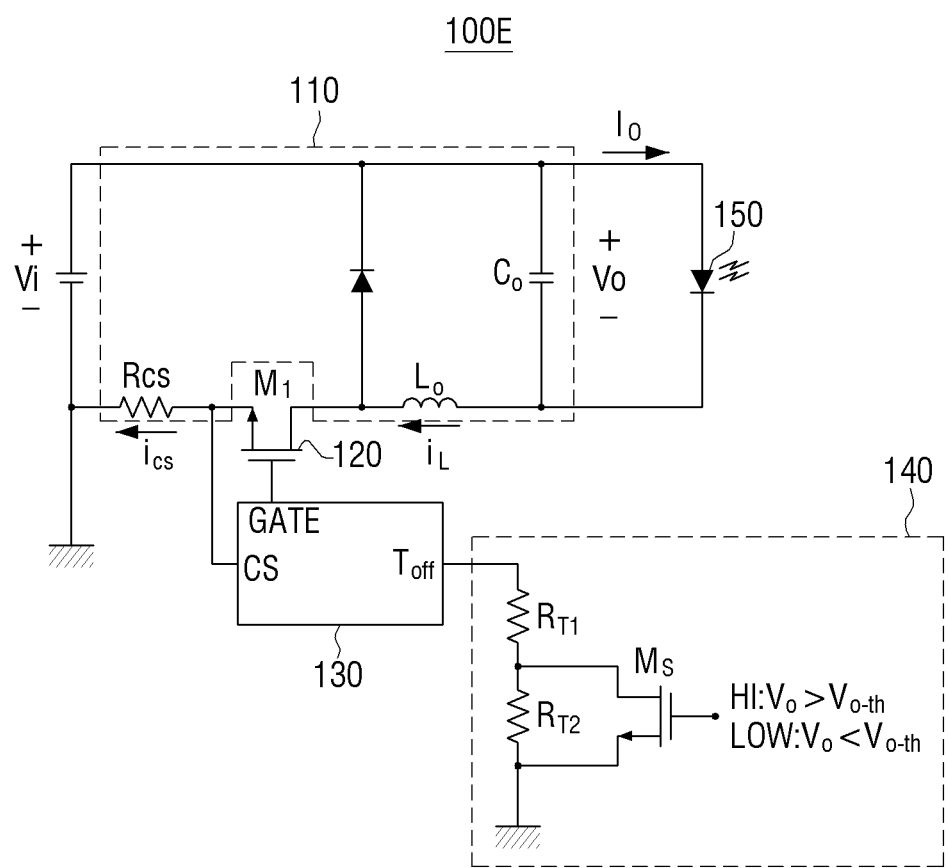
Figure 10:
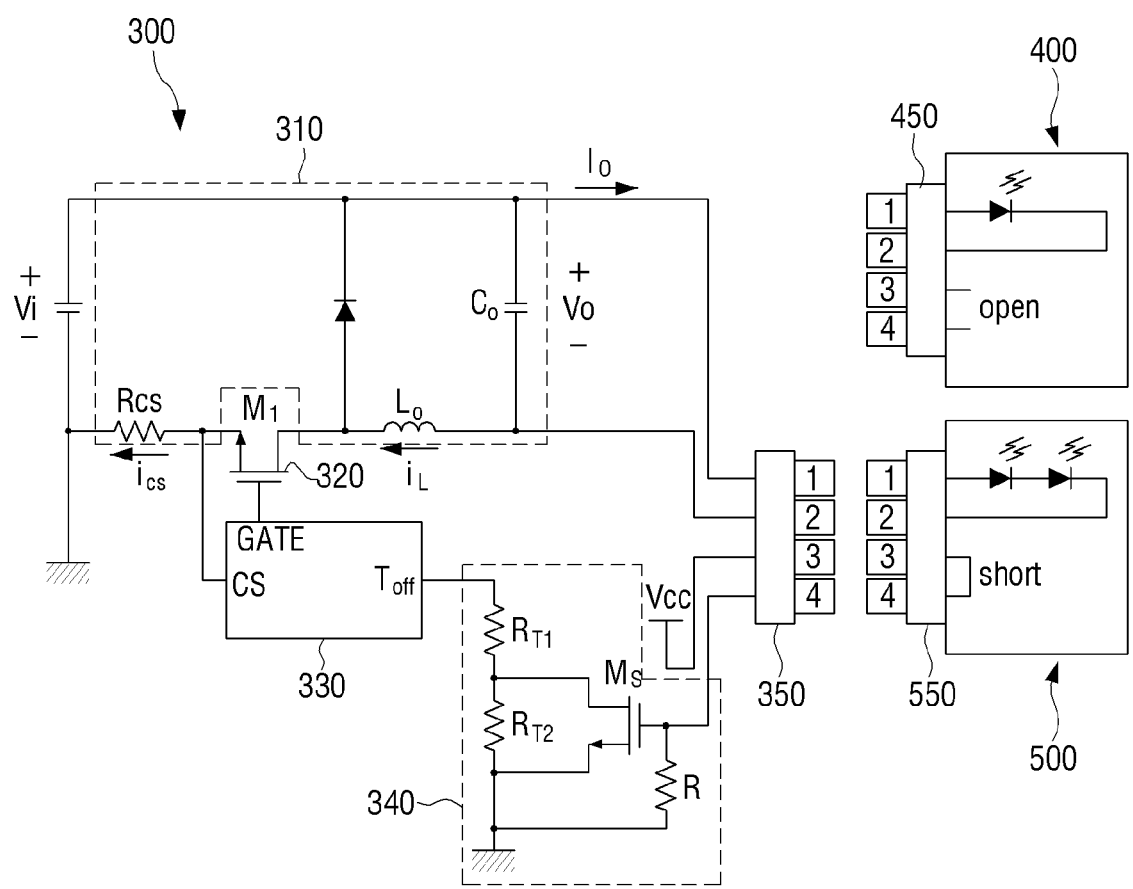
Figure 11:
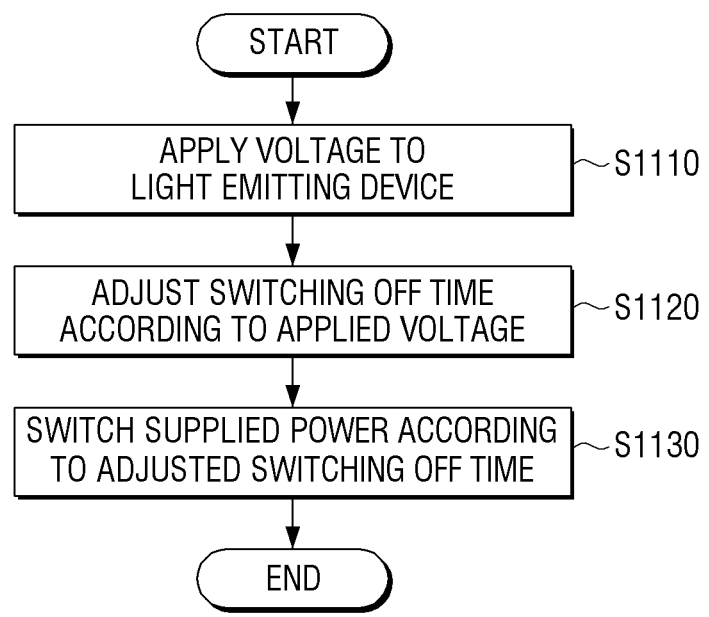

The above and/or other aspects of the exemplary embodiments will be more apparent with reference to the accompanying drawings, in which:

FIG. 1 illustrates a circuit diagram according to a conventional light emitting driving apparatus;

FIGS. 2(a)-(c) illustrate various examples of graphs of a current waveform characteristic according to a frequency of a conventional light emitting driving apparatus;

FIG. 3 is a block diagram of a light emitting driving apparatus according to an exemplary embodiment;

FIGS. 4(a)-(c) illustrate various examples of graphs of a turn-off time characteristic according to a voltage applied to a light emitting device of a light emitting driving apparatus according to an exemplary embodiment;

FIGS. 5 to 10 illustrate various examples of a circuit diagram of a light emitting driving apparatus according to an exemplary embodiment; and FIG. 11 is a flowchart of a method of controlling a light emitting driving apparatus according to an exemplary embodiment.

DETAILED DESCRIPTION

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. Any modifications, variations or replacement that can be easily derived by those skilled in the art from the detailed description and the exemplary embodiments should fall within the scope of the exemplary embodiments.

FIG. 3 is a block diagram of a light emitting driving apparatus 100 according to an exemplary embodiment. Referring to FIG. 3, the light emitting driving apparatus 100 according to an exemplary embodiment includes a driver 110, a switch 120, and a controller 140. The light emitting driving apparatus 100 may be a load end, that is, a direct-current (DC)-DC converter for supplying a predetermined voltage to the load end, in particular, a buck type DC-DC converter.

The driver 110 is a component for driving the light emitting device (not shown). A power supply for supplying DC power to the light emitting driving apparatus 100 is connected to one side of the driver 110. A light emitting device driven by power supplied by the power supply is also connected to the driver 110.

Figure 5:
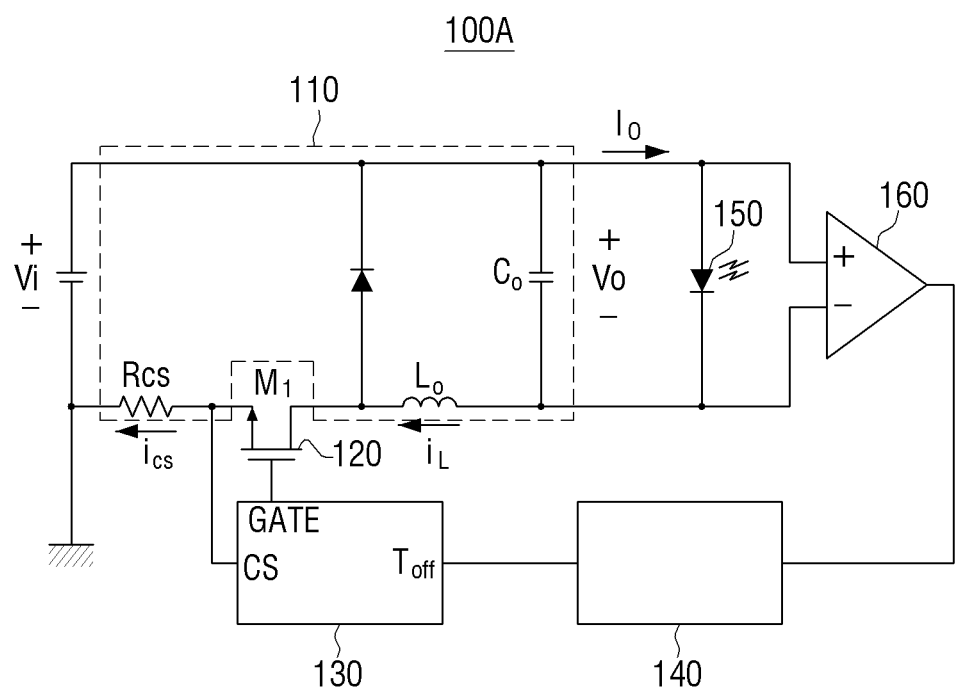

In addition, the driver 110 may include a diode, a capacitor, an inductor connected between the diode and the capacitor, and a voltage detecting resistor Rcs connected between an inductor and one side of the power supply, as shown, for example, in FIG. 5.

According to an exemplary embodiment, the light emitting device may be a light emitting diode (LED) or an LED array formed by connecting a plurality of LEDs in series to each other. In addition, the light emitting device may be formed by connecting a plurality of LED arrays in parallel to each other.

The switch 120 is a component for switching power supplied to the light emitting device. In detail, when the switch 120 is turned on, DC power is supplied to the light emitting device, and when the switch 120 is turned off, DC power is not supplied to the light emitting device. That is, when the switch 120 is turned on, current flowing in the inductor is linearly increased, and when the switch 120 is turn off, the current flowing in the inductor is linearly decreased. According to an exemplary embodiment, the current flowing in the inductor is equal to an output current of the light emitting device, as previously described.

In addition, the switch 120 may be connected in series between the voltage detecting resistor Rcs and the inductor of the driver 110, as shown, for example, in FIG. 5. According to this exemplary embodiment, the switch 120 may be a MOSFET and may be switched on or off by adjusting a gate voltage of the MOSFET.

The controller 140 adjusts a switching off time of the switch 120 according to a voltage applied to the light emitting device. In detail, the controller 140 may control a turn-off time of the switch 120 such that an output current value of the light emitting device is equal to a predetermined current value. That is, the controller 140 may adjust the switching off time of the switch 120 to correspond to the voltage applied to the light emitting device in order to minimize a change in a switching frequency according to a change in the voltage applied to the light emitting device. Hereinafter, a detailed operation of the controller 140 will be described with reference to graphs, according to the exemplary embodiment illustrated in FIGS. 4(a)-(c).

FIGS. 4(a)-(c) illustrate various examples of graphs of a turn-off time characteristic according to a voltage applied to a light emitting device of the light emitting driving apparatus 100 according to an exemplary embodiment.

As shown in FIG. 4(a), the controller 140 may apply a switching off time that is inversely proportional to a voltage applied to a light emitting device. For example, when the voltage applied to the light emitting device is greater than a reference voltage, the controller 140 may apply the switching off time smaller than a reference switching off time. On the other hand, when the voltage applied to the light emitting device is smaller than the reference voltage, the controller 140 may apply the switching off time greater than the reference a switching off time. The turn-off time characteristic as shown in FIG. 4(a) may correspond to an operation characteristic of the controller 140 when resistance of a light emitting device continuously varies with respect to a power which is constantly supplied.

Referring to FIG. 4(b), the controller 140 may apply a switching off time that is inversely proportional to the voltage applied to the light emitting device in a predetermined voltage period $V_{o-min}$ to $V_{o-max}$. The operation characteristic of the controller 140 in the predetermined voltage period $V_{o-min}$ to $V_{o-max}$ is the same as the operation as disclosed with respect to the exemplary embodiment illustrated in FIG. 4(a). According to an exemplary embodiment, the graph illustrated by FIG. 4(b) may correspond to an operation characteristic of the controller 140 when a resistance of a light emitting device varies in a predetermined range with respect to a power which is constantly supplied.

Figure 4:
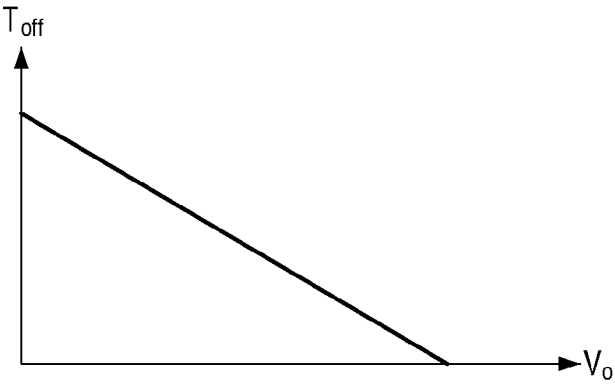
Figure 4:
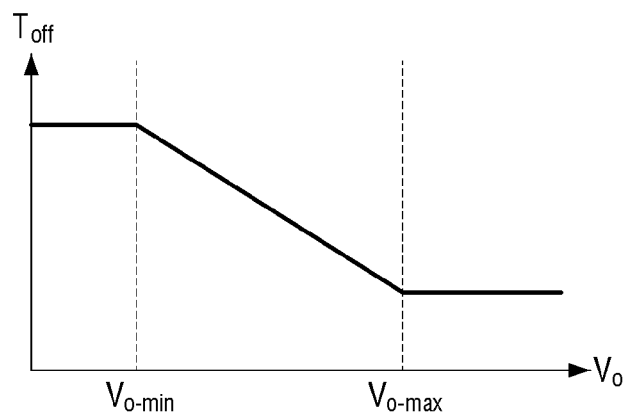
Figure 4:
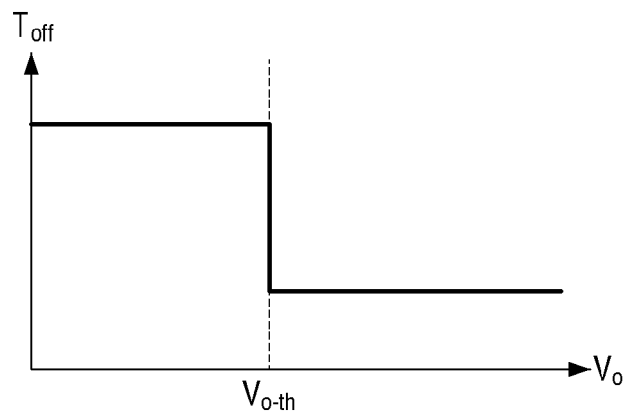

Referring to FIG. 4©, the controller 140 may apply a first switching off time when a voltage lower than a predetermined voltage ($V_{o-th}$) is applied to the light emitting device, and may apply a second switching off time smaller than the first switching off time when a voltage that is equal to or greater than the predetermined voltage ($V_{o-th}$) is applied to the light emitting device. According to an exemplary embodiment, FIG. 4(c) may correspond to an operation characteristic of the controller 140 when a resistance of a light emitting device varies to any one of two values with respect to a constant supplied power.

According to the aforementioned operation of the controller 140, even if a resistance of the light emitting device or a voltage applied to the light emitting device varies, a change in a switching frequency as shown in FIG. 2(b) or 2(c) may be prevented. That is, a switching frequency characteristic as illustrated in FIG. 2(a) is exhibited in the stable form, and thus, side effects due to a change in a switching frequency do not occur.

Hereinafter, detailed circuits of the light emitting driving apparatus 100 according to exemplary embodiments will be described.

FIGS. 5 to 10 are various examples of a circuit diagram of the light emitting driving apparatus 100 according to an exemplary embodiment. Hereinafter, a repeated description of the above will not be given when the disclosure is the same.

Referring to FIG. 5, a light emitting driving apparatus 100A according to a first exemplary embodiment includes the driver 110, the switch 120, a pulse width modulation (PWM) adjuster 130, the controller 140, a light emitter 150, and a voltage detector 160.

The light emitter 150 may include a light emitting device, in particular, an LED. Accordingly to the exemplary embodiment, the light emitting device is not limited to one LED, as illustrated in FIG. 5, and may be an LED array formed by connecting a plurality of LEDs in series with each other. In addition, the light emitting device may be formed by connecting a plurality of LED arrays in parallel to each other.

The voltage detector 160 is connected to the light emitting device and is a component for detecting a voltage applied to the light emitting device. As illustrated in FIG. 5, an input end of the voltage detector 160 is connected to two nodes of the light emitter 150 and detects a voltage applied to the light emitter 150. The voltage applied to the light emitter 150, detected by the voltage detector 160, is transmitted to the controller 140.

The controller 140 adjusts a switching off time of the switch 120 according to the voltage applied to the light emitting device, as detected by the voltage detector 160. According to the exemplary embodiment, the controller 140 may control a turn-off time of the switch 120 such that the voltage applied to the light emitting device is equal to a predetermined voltage. That is, the controller 140 may adjust a switching off time of the switch 120 to correspond to the voltage applied to the light emitting device in order to minimize a change in a switching frequency according to a change in the voltage applied to the light emitting device. According to the exemplary embodiment, a switching off time corresponding to the voltage applied to the light emitting device is the same as in the disclosure of FIGS. 4(a)-(c).

The PWM adjuster 130 is connected to the switch 120 and is a component for adjusting a PWM of the switch 120. In detail, the controller 140 may control the PWM adjuster 130 to adjust the PWM of the switch 120 based on the adjusted switching off time. According to the exemplary embodiment, the PWM of the switch 120, adjusted by the controller 140, may be a normal waveform as illustrated in FIG. 2(a).

Figure 6:
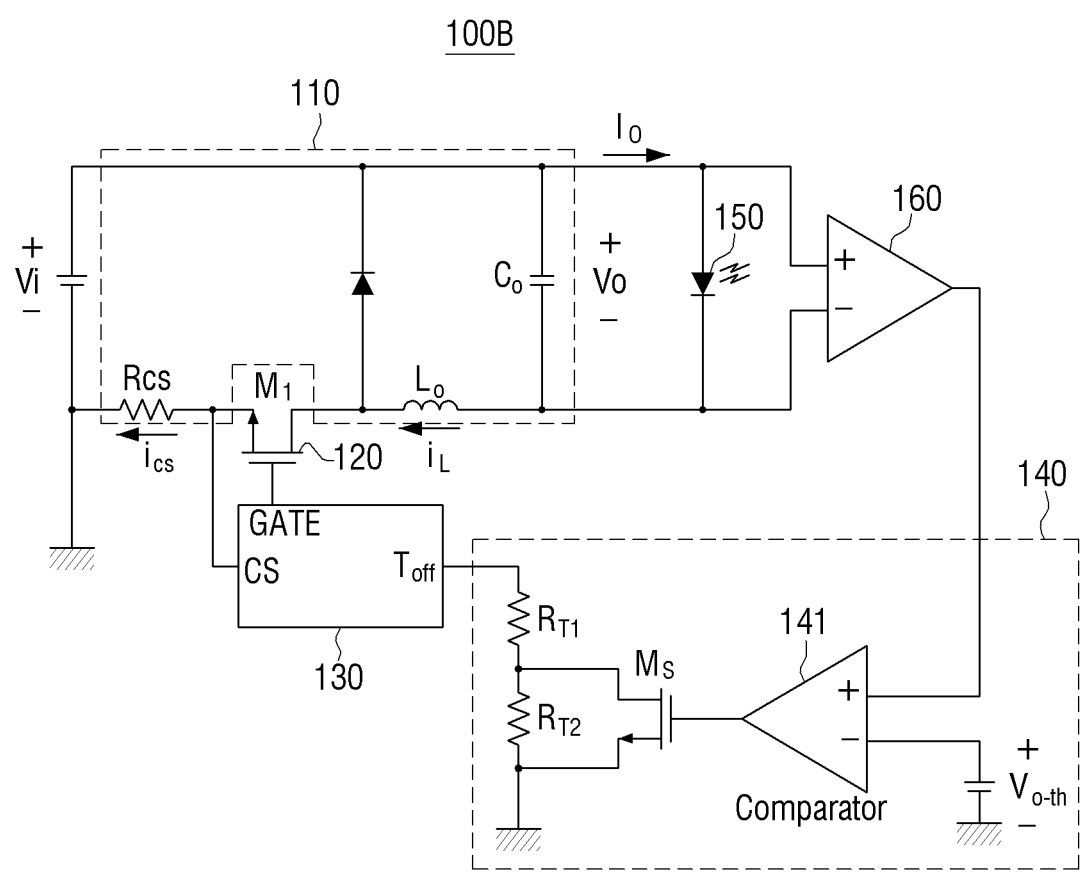

Referring to FIG. 6, a light emitting driving apparatus 100B according to a second exemplary embodiment includes the driver 110, the switch 120, the PWM adjuster 130, the controller 140, the light emitter 150, and the voltage detector 160. In particular, the controller 140 may include a plurality of resistance devices, a switch Ms, and a voltage comparator 141.

The plural resistance devices are connected to the PWM adjuster 130 and the switch Ms is connected to at least one of the plural resistance devices. As illustrated in FIG. 6, a first resistor RT1 and a second resistor RT2 are connected to each other, and the switch Ms is connected in parallel to the second resistor RT2. According to the exemplary embodiment, the switch Ms may be embodied as a MOSFET, but is not limited thereto.

The voltage comparator 141 compares a detected voltage and a reference voltage and outputs a switching signal to the switch Ms. As illustrated in FIG. 6, an input end of the voltage comparator 141 inputs an output voltage of the voltage detector 160 and a predetermined voltage $V_{o-th}$. As a comparison result of the voltage comparator 141, when the output voltage of the voltage detector 160 is equal to or greater than the predetermined voltage $V_{o-th}$, the switch Ms is turned on to increase a switching off time of the switch 120. When the output voltage of the voltage detector 160 is less than the predetermined voltage $V_{o-th}$, the switch Ms is turned off to reduce the switching off time of the switch 120.

The PWM adjustment of the PWM adjuster 130 with respect to the switch 120 based on the adjusted switching off time is the same as in the above description with respect to the first exemplary embodiment.

Figure 7:
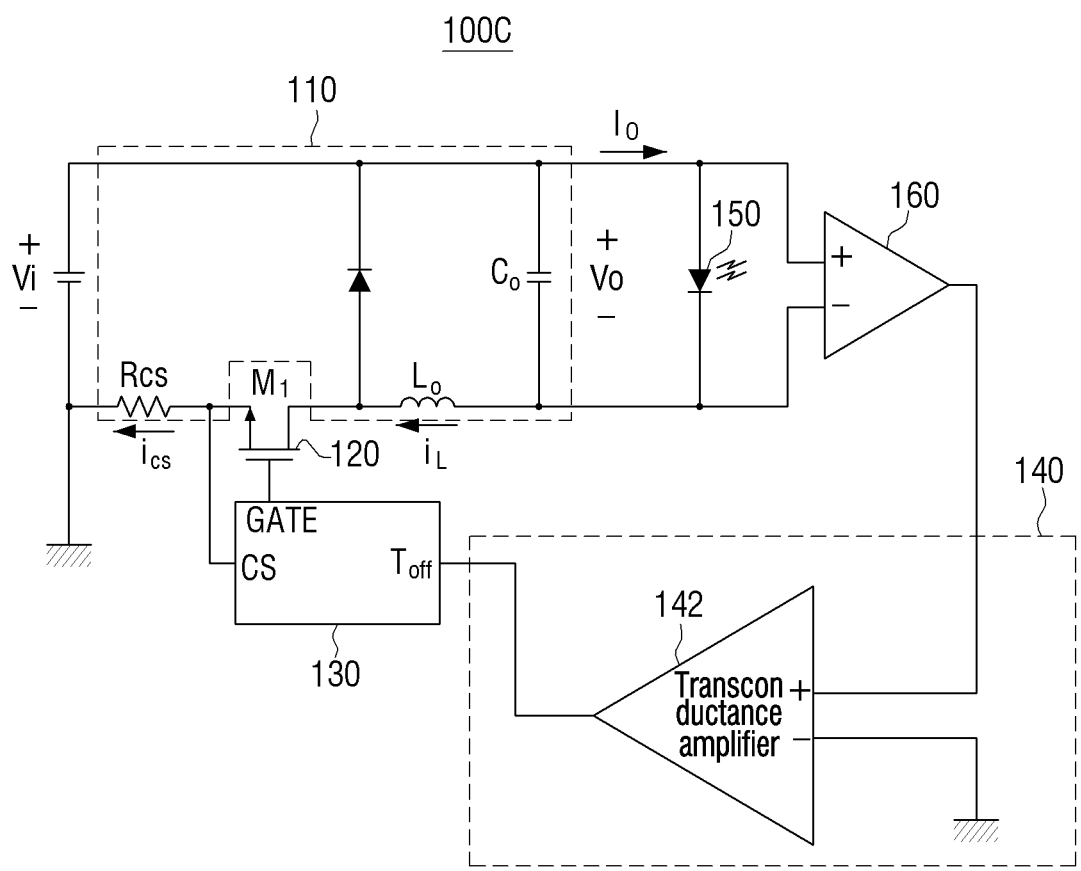

Referring to FIG. 7, a light emitting driving apparatus 100C according to a third exemplary embodiment includes the driver 110, the switch 120, the PWM adjuster 130, the controller 140, the light emitter 150, and the voltage detector 160. In particular, the controller 140 may be embodied as a transconductance amplifier 142.

The transconductance amplifier 142 is one form of a voltage control current source and is a component for inputting two voltages to an input end and converting a difference value between the two input voltages into current.

Thus, as illustrated in FIG. 7, the transconductance amplifier 142 converts a voltage detected by the voltage detector 160 into current corresponding to a switching off time of the switch 120 to output the current to the PWM adjuster 130.

The PWM adjustment of the PWM adjuster 130 with respect to the switch 120 based on the adjusted switching off time is the same as in the above description with respect to the first and second exemplary embodiments. However, according to this exemplary embodiment, the PWM adjustment is different in that the second embodiment described with reference to FIG. 6 has discontinuous switching off time adjustment characteristic as illustrated in FIG. 4(c), whereas this exemplary embodiment has a continuous switching off time adjustment characteristic as illustrated in FIG. 4(a).

Figure 8:
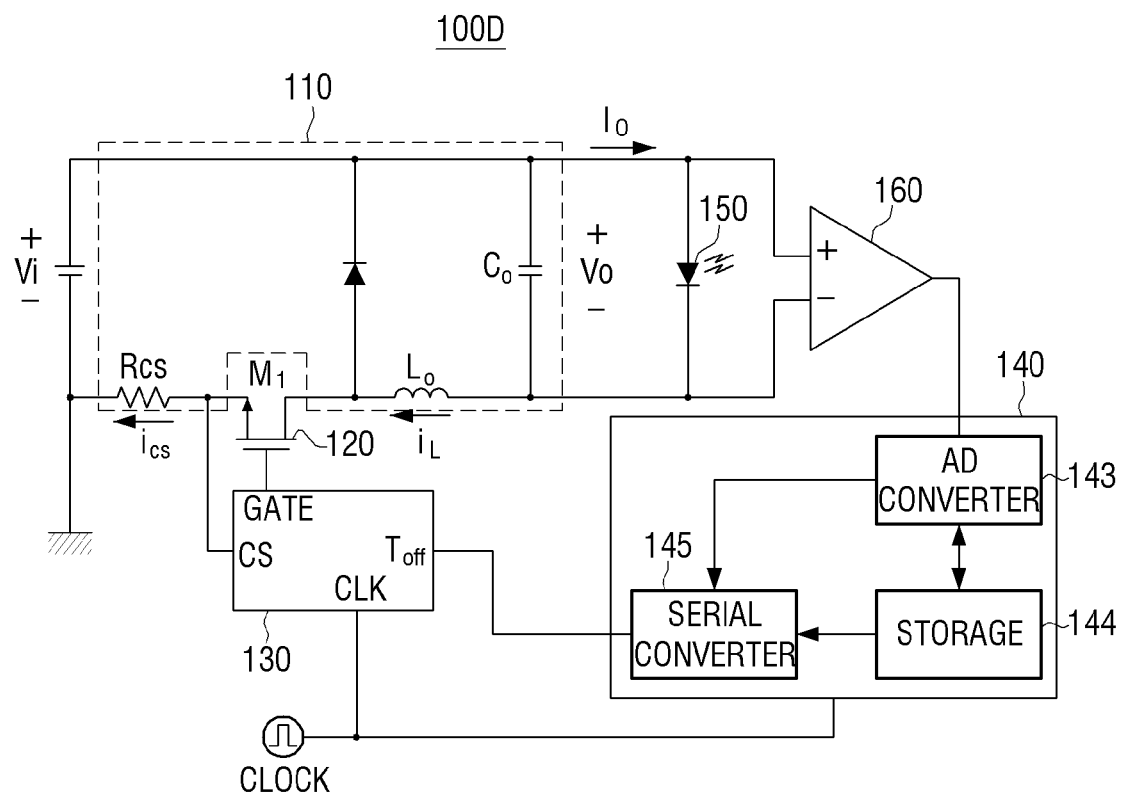

Referring to FIG. 8, a light emitting driving apparatus 100D according to a fourth exemplary embodiment includes the driver 110, the switch 120, the PWM adjuster 130, the controller 140, the light emitter 150, and the voltage detector 160. In particular, the controller 140 may include a storage 144, an AD converter 143, and a serial converter 145.

The AD converter 143 is connected to an output end of the voltage detector 160 and converts a voltage detected by the voltage detector 160 into a digital signal.

The storage 144 stores information about the digital signal obtained by converting the voltage applied to the light emitter 150, that is, a voltage detected by the voltage detector 160 and information about a switching off time corresponding to the digital signal.

The serial converter 145 allocates a unique bit value according to an output voltage converted into a digital signal and converts the bit value into serial data. Thus, the serial converter 145 detects a switching off time corresponding to the converted serial data based on the information stored in the storage 144 and outputs the switching off time to the PWM adjuster 130.

The PWM adjustment of the PWM adjuster 130 with respect to the switch 120 based on the adjusted switching off time is the same as in the above description with respect to the third exemplary embodiment.

Referring to FIG. 9, a light emitting driving apparatus 100E according to a fifth exemplary embodiment includes the driver 110, the switch 120, the PWM adjuster 130, the controller 140, and the light emitter 150. In particular, the controller 140 may include a plurality of resistance devices or the switch Ms.

The plural resistance devices are connected to the PWM adjuster 130 and the switch Ms is connected to at least one of the plural resistance devices. As illustrated in FIG. 6, the first resistor RT1 and the second resistor RT2 are connected to the PWM adjuster 130, and the switch Ms is connected in parallel to the second resistor RT2. According to the exemplary embodiment, the switch Ms may be embodied as a MOSFET, but is not limited thereto.

The light emitting driving apparatus 100E according to the exemplary embodiment does not include the voltage detector 160. If the voltage detector 160 is not provided to directly detect a voltage applied to the light emitter 150, a module (not shown) for determining whether the voltage applied to the light emitter 150 is higher or lower than a predetermined voltage is provided.

As illustrated in FIG. 9, one of a high signal and a low signal is supplied to a gate of the switch Ms. Thus, as a determination result of the aforementioned module (not shown), when the voltage applied to the light emitter 150 is equal to or greater than a predetermined voltage $V_{o-th}$, a high signal is supplied to the gate of the switch Ms, so that the switch Ms is turned on to increase a switching off time of the switch 120. In addition, when the voltage applied to the light emitter 150 is less than the predetermined voltage $V_{o-th}$, a low signal is supplied to the gate of the switch Ms. That is, the switch Ms is turned off to reduce a switching off time of the switch 120.

The PWM adjustment of the PWM adjuster 130 with respect to the switch 120 based on the adjusted switching off time is the same as in the above description with respect to the fourth and fifth exemplary embodiments.

Referring to FIG. 10, a light emitting driving apparatus 300 according to a sixth exemplary embodiment includes a driver 310, a switch 320, a PWM adjuster 330, a controller 340, and a connector 350.

The connector 350 is a component for connecting with an external light emitting device or a light emitting modules 400 and 500, respectively. As illustrated in FIG. 10, the connector 350 is formed at one side of the light emitting driving apparatus 300 according to the exemplary embodiment such that the light emitting driving apparatus 300 is detachable from the light emitting device 400 or the light emitting modules 500. That is, the light emitting driving apparatus 300 according to the exemplary embodiment may not include an integrated light emitting device and may drive the light emitting device 400 or the light emitting modules 500 connected via the connector 350.

The connector 350 of the light emitting driving apparatus 300 includes a plurality of pins. Connectors 450 and 550 of the light emitting device 400 and the light emitting modules 500, which are connectable to the connector 350, have the same number of pins.

The light emitting device 400 and the light emitting modules 500 include a different number of light emitting devices according to a standard. For example, the light emitting device 400 may have a length of 28 inches and the light emitting modules 500 may have a length of 32 inches.

Each of the light emitting device 400 and the light emitting modules 500 include at least two open or circuited pins. In particular, the at least two pins of the light emitting devices 400 and the light emitting modules 500 may be opened or circuited according to a standard. For example, pins #3 and #4 of the light emitting device 400 may be opened and pins #3 and #4 of the light emitting modules 500 may be circuited.

The controller 340 adjusts a switching off time of the switch 320 based on a voltage applied to at least one of a plurality of pins according to connection of the light emitting device. According to an exemplary embodiment, the controller 340 may include a plurality of resistance devices or the switch Ms.

As illustrated in FIG. 10, the first resistor RT1 and the second resistor RT2 are connected to the PWM adjuster 330 and the switch Ms is connected in parallel to the second resistor RT2. According to the exemplary embodiment, the switch Ms may be a MOSFET, but is not limited thereto. In addition, a third resistor R may be connected to an input end (a gate) of the switch Ms.

As illustrated in FIG. 10, when the second light emitting module 500 is connected to the connector 350, VCC [V] is applied to the gate of the switch Ms. Accordingly, when the switch Ms is turned on, a switching off time of the switch 320 may be increased. On the other hand, when the first light emitting module 400 is connected to the connector 350, 0 [V] is applied to the gate of the switch Ms. Accordingly, the switch Ms may be turned off to reduce a switching off time of the switch 320.

The PWM adjustment of the PWM adjuster 330 with respect to the switch 320 based on the adjusted switching off time is the same as in the above description with respect to the fourth, fifth, and sixth exemplary embodiments.

FIG. 11 illustrates a flowchart of a method of controlling the light emitting driving apparatus 100 according to an exemplary embodiment. Hereinafter, repeated description of the above description will not be given.

Referring to FIG. 11, when a voltage is applied to the light emitter 150 (S1110), the light emitting driving apparatus 100 detects a voltage applied to the light emitter 150.

According to the applied voltage, a switching off time of the switch 120 is adjusted (S1120). According to the exemplary embodiment, the light emitting driving apparatus 100 may adjust PWM of the switch 120. Accordingly, the light emitting driving apparatus 100 may adjust PWM of the switch 120 based on the adjusted switching off time.

The light emitting driving apparatus 100 may adjust a switching off time according to the detected applied voltage of the light emitter 150. Thus, the light emitting driving apparatus 100 may convert the detected voltage of the light emitter 150 into current corresponding to the switching off time.

In addition, the light emitting driving apparatus 100 may store information about a switching off time corresponding to a digital signal of the voltage applied to the light emitter 150. Accordingly, the light emitting driving apparatus 100 may convert the detected voltage into the digital signal and then detect a switching off time corresponding to the converted digital signal based on the stored information.

Then, the power supplied to the light emitter 150 is switched according to the adjusted switching off time (S1130).

The method of controlling of the light emitting driving apparatus according to the aforementioned exemplary embodiments may be stored in a non-transitory readable medium. The non-transitory readable medium may be embedded and used in various apparatuses.

The present exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The use of the terms "a" and "an" and "the" and similar referents in the context of describing the exemplary embodiments are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments and does not pose a limitation on the scope of the exemplary embodiments unless otherwise claimed. Additionally, it will be understood by those of ordinary skill in the art that various modifications, combinations, and changes can be formed according to design conditions and factors within the scope of the attached claims or the equivalents.

While one or more exemplary embodiments have been described with reference to the figures, it will be understood by those of ordinary skill in the art that various changes in form and details may be made therein without departing from the spirit and scope of the exemplary embodiments as defined by the following claims.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light emitting driving apparatus comprising:
 a driver configured to drive a light emitting device;
 a switch configured to supply power to the light emitting device; and
 a pulse width modulation (PWM) adjuster connected to the switch and configured to adjust a PWM of the switch;
 a voltage detector connected to the light emitting device and configured to detect the voltage applied to the light emitting device; and
 a controller configured to adjust a switching off time of the switch according to the detected voltage;
 wherein the controller comprises:
 a storage configured to store information about the switching off time corresponding to a digital signal of the voltage applied to the light emitting device;
 an analog to digital (AD) converter configured to convert the detected voltage into a digital signal; and
 a serial converter configured to detect the switching off time corresponding to the converted digital signal based on the stored information and to output the switching off time to the PWM adjuster.

2. The light emitting driving apparatus as claimed in claim 1, wherein the controller comprises:
 a plurality of resistance devices connected to the PWM adjuster, and
 a switch connected in parallel to at least one of the plurality of resistance devices.

3. The light emitting driving apparatus as claimed in claim 2, wherein the controller further comprises a voltage comparator configured to compare the detected voltage with a reference voltage and to output a switching signal of the switch.

4. The light emitting driving apparatus as claimed in claim 1, wherein the controller includes a transconductance amplifier configured to convert the detected voltage into a current corresponding to the switching off time of the switch,
 wherein the current is output to the PWM adjuster.

5. The light emitting driving apparatus as claimed in claim 1, further comprising:
 a light emitter including the light emitting device.

6. The light emitting driving apparatus as claimed in claim 1, further comprising:
 a connector configured to connect the light emitting driving apparatus with the light emitting device.

7. The light emitting driving apparatus as claimed in claim 6, wherein the connector includes a plurality of pins, and
 the controller adjusts the switching off time of the switch based on the voltage applied to at least one of the plurality of pins according to the connector of the light emitting device.

8. The light emitting driving apparatus as claimed in claim 7, wherein the light emitting device includes at least two open pins or two circuited pins.

9. The light emitting driving apparatus as claimed in claim 1, wherein the light emitting device includes a light emitting diode (LED) array formed by connecting a plurality of LEDs in series.

10. A method of controlling a light emitting driving apparatus which stores information about the switching off time corresponding to a digital signal of the voltage applied to the light emitting device, the method comprising:
 applying a voltage to a light emitting device;
 detecting a voltage applied to the light emitting device;
 converting the detected voltage into a digital signal;
 detecting a switching off time corresponding to the converted digital signal based on the stored information; and
 switching a power supplied to the light emitting device according to the detected switching off.

11. The method as claimed in claim 10, further comprising:
 adjusting the PWM of the switch based on the detected switching off time.

12. The method as claimed in claim 10, further comprising:
 converting the detected voltage into a current corresponding to the switching off time of the switch.

* * * * *